(12) United States Patent
Lee et al.

(10) Patent No.: US 7,864,266 B2
(45) Date of Patent: Jan. 4, 2011

(54) DIFFUSER PLATE, BACKLIGHT AND DISPLAY HAVING THE SAME

(75) Inventors: Kyung Joon Lee, Uiwang-si (KR); Seung Man Choi, Uiwang-si (KR); Man Suk Kim, Uiwang-si (KR)

(73) Assignee: Cheil Industries, Inc., Gumi-si, Kyeongsangbuk-do (KR)

( * ) Notice: Subject to any disclaimer, the term of this patent is extended or adjusted under 35 U.S.C. 154(b) by 126 days.

(21) Appl. No.: 12/289,636

(22) Filed: Oct. 31, 2008

(65) Prior Publication Data
US 2009/0128740 A1    May 21, 2009

(30) Foreign Application Priority Data
Oct. 31, 2007    (KR)    ............... 10-2007-0109947

(51) Int. Cl.
*G02F 1/1335*    (2006.01)
*F21V 11/00*    (2006.01)

(52) U.S. Cl. ............... 349/64; 349/61; 349/62; 362/355; 362/97.2

(58) Field of Classification Search ............... 349/112, 349/61, 62, 57, 113, 123, 201, 95, 166, 64; 362/355, 97.2
See application file for complete search history.

(56) References Cited

U.S. PATENT DOCUMENTS

| | | | | |
|---|---|---|---|---|
| 6,147,804 | A * | 11/2000 | Kashima et al. | ............. 359/599 |
| 6,333,817 | B1 * | 12/2001 | Kashima et al. | ............. 359/599 |
| 7,156,546 | B2 * | 1/2007 | Higashiyama | ............. 362/561 |
| 2008/0062719 | A1 * | 3/2008 | Shiau et al. | ................. 362/617 |
| 2009/0128740 | A1 * | 5/2009 | Lee et al. | ..................... 349/64 |

* cited by examiner

*Primary Examiner*—Brian M Healy
(74) *Attorney, Agent, or Firm*—Lee & Morse, P.C.

(57) ABSTRACT

A diffuser plate includes a first optical sheet having a rear surface configured to receive light from a light source and having a front surface configured to provide light to a second optical sheet, the first optical sheet having a refractive part that includes a plurality of optical members at a surface of the first optical sheet, and a second optical sheet disposed in front of the first optical sheet, the second optical sheet including a rear surface configured to receive light from the first optical sheet, a front surface configured to emit light, and light-scattering beads within the first optical sheet.

20 Claims, 12 Drawing Sheets

FIG. 8
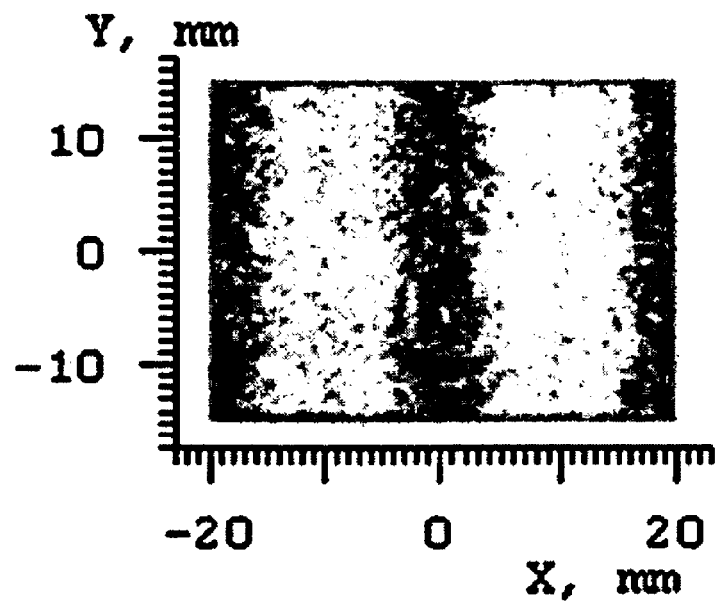
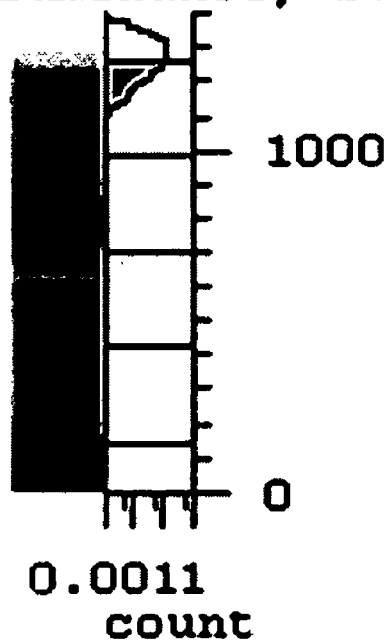

FIG. 9
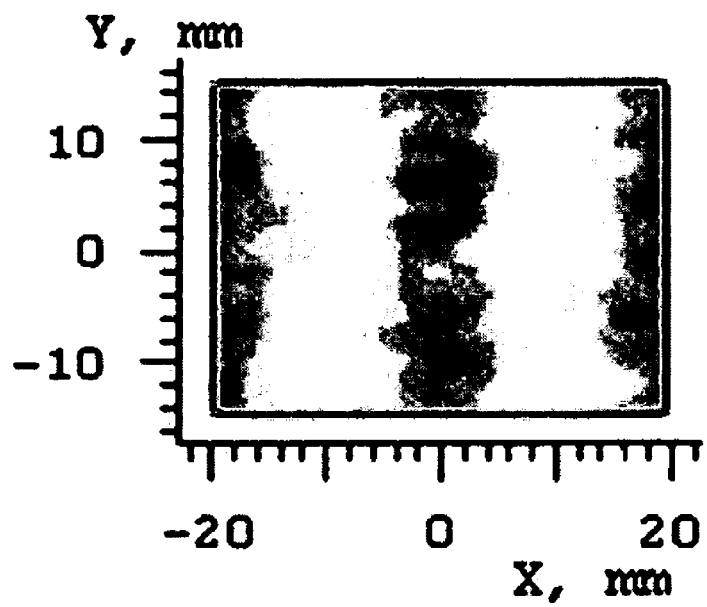
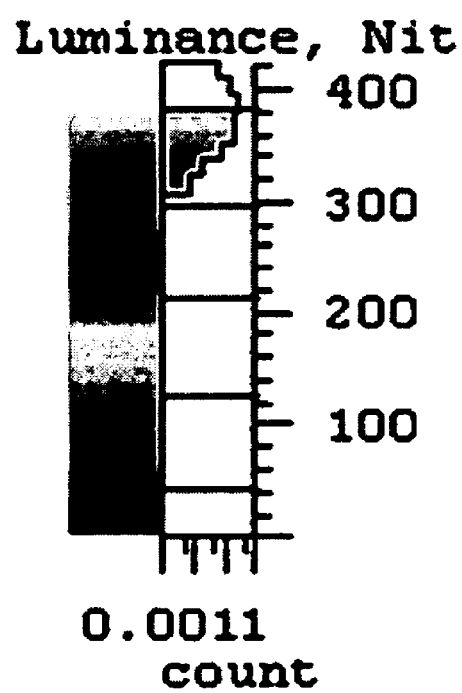

FIG. 11
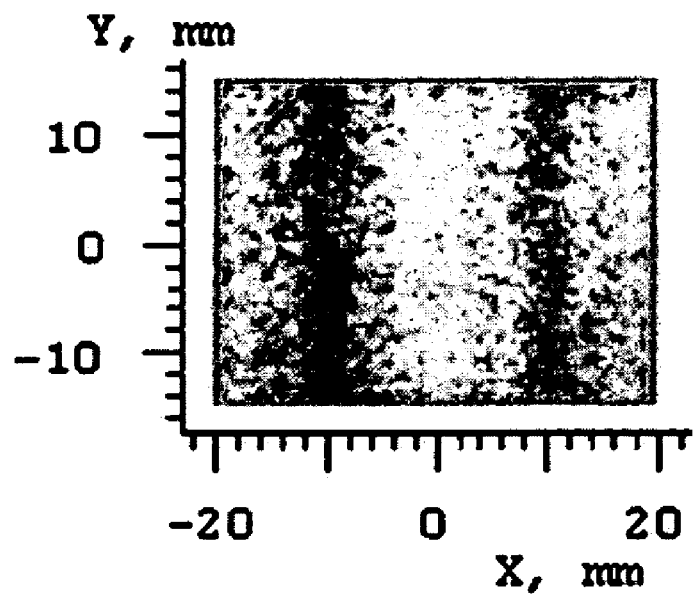
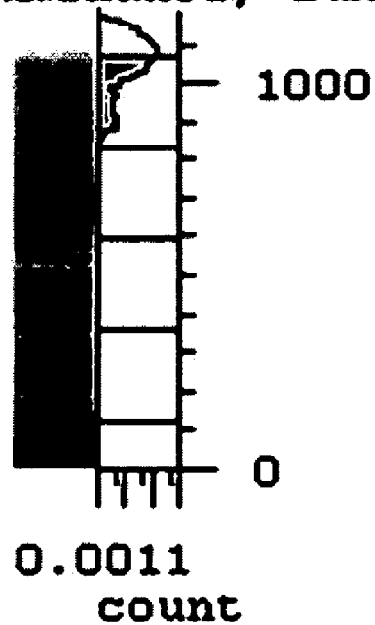

FIG. 12
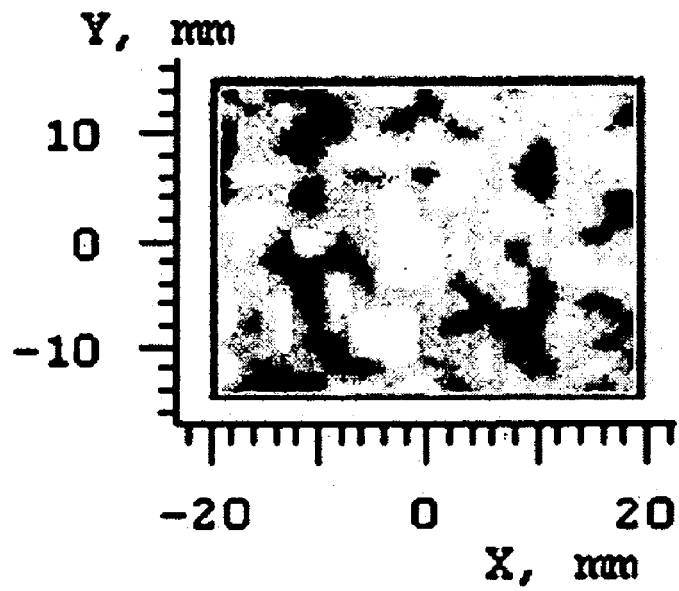
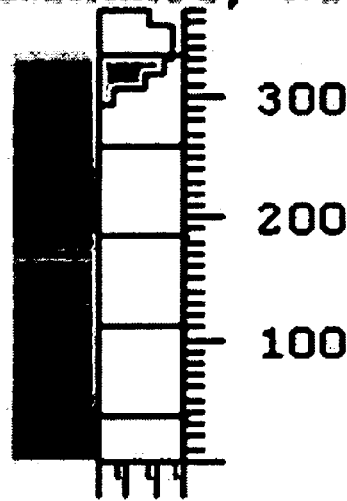

FIG. 13
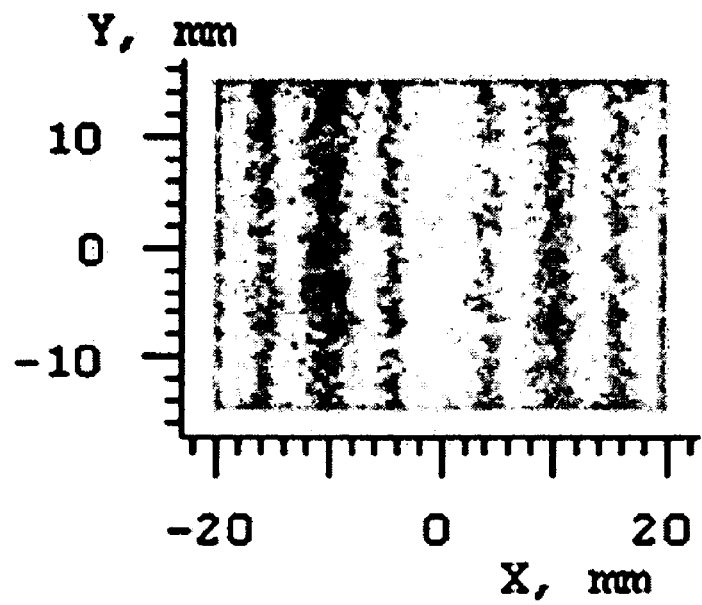
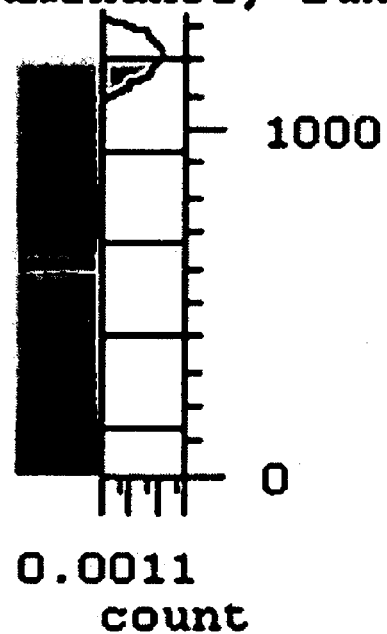

FIG. 14
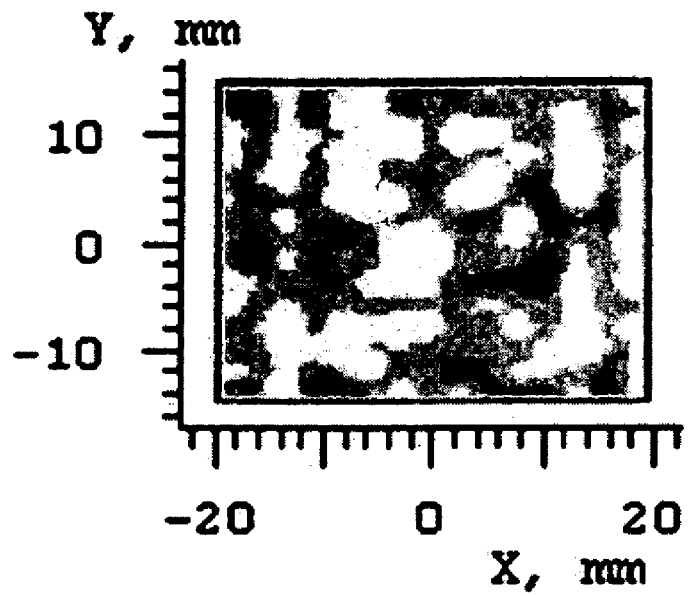
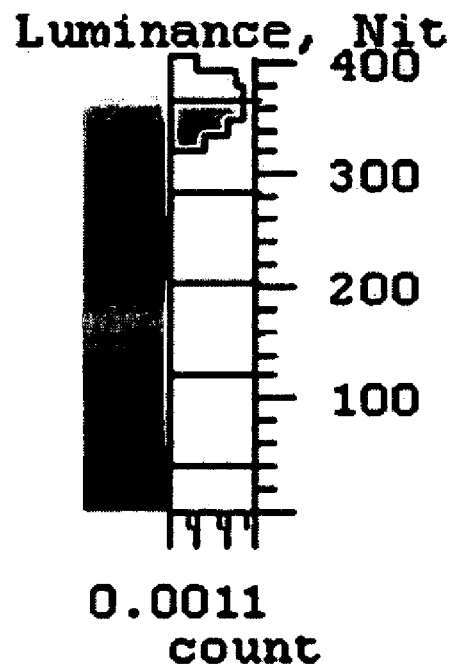

DIFFUSER PLATE, BACKLIGHT AND DISPLAY HAVING THE SAME

BACKGROUND OF THE INVENTION

1. Field of the Invention

Embodiments relate to a diffuser plate, a backlight and a display having the same.

2. Description of the Related Art

Low power consumption and high luminance are important issues for liquid crystal display (LCD) devices, e.g., televisions, computer monitors, handheld devices, etc. Typically, LCD devices include a backlight unit, the characteristics of which may have a significant impact on power consumption and luminance.

Types of backlight units include a direct type backlight unit, in which lamps are disposed under a liquid crystal panel, and an edge type backlight unit, in which a light guide is installed under a liquid crystal panel and lamps are disposed at one end of the light guide. The direct type backlight unit has a high light utilization efficiency and a simple configuration, and is not limited to a particular size of display surface, thus being widely used in large-scale LCDs.

FIG. 15 illustrates an exploded perspective view of a structure of a general LCD.

With reference to FIG. 15, the LCD includes a liquid crystal panel 10 and a backlight unit 20. Liquid crystal cells are arranged in a matrix on the liquid crystal panel 10 such that light transmittance is adjusted by applying an electric field, and a polarizing plate 11 that changes light emitted from the backlight unit 20 to polarized light are respectively attached to upper and lower surfaces of the liquid crystal panel 10. The backlight unit 20 includes lamps 21 serving as light sources, a reflection plate 22, a diffuser plate 23, and optical sheets 24. A plurality of the lamps 21 may be provided to emit light.

The diffuser plate 23 serves to diffuse light emitted from the lamps 21 so as to prevent Becke's lines (bright lines) of the lamps 21 from being seen. Beads may be added into the diffuser plate 23 to diffuse light. A large amount of the beads may be necessary to prevent the images of the lamps 21 from being seen by the viewer.

The thickness of liquid crystal displays has been gradually thinned to provide a thin profile and light weight. Accordingly, reduced-thickness backlight units have been developed. As a result, the distance between light sources and a diffuser plate in the backlight unit has been reduced. When the distance between the light sources and the diffuser plate is reduced, a diffuser plate that relies on beads for diffusion has a limited ability to diffuse the light sources, such that images of the light sources, i.e., "hot spots" or brightly-lit regions, are generated at positions corresponding to the light sources. Accordingly, there is a need for a diffuser plate suitable for use in a thin backlight unit and capable of reducing or eliminating images of light sources in the backlight. Additionally, there is a need for a backlight unit that provides uniform brightness regardless of viewing angle.

SUMMARY OF THE INVENTION

Embodiments are therefore directed to a diffuser plate, a backlight and a display having the same, which substantially overcome one or more of the problems due to the limitations and disadvantages of the related art.

It is therefore a feature of an embodiment to provide a diffuser plate configured to reduce a thickness of a backlight unit.

It is therefore another feature of an embodiment to provide a backlight unit providing uniform brightness for a wide range of viewing angles.

At least one of the above and other features and advantages may be realized by providing a diffuser plate, including a first optical sheet having a rear surface configured to receive light from a light source and having a front surface configured to provide light to a second optical sheet, the first optical sheet having a refractive part that includes a plurality of optical members at a surface of the first optical sheet, and a second optical sheet disposed in front of the first optical sheet, the second optical sheet including a rear surface configured to receive light from the first optical sheet, a front surface configured to emit light, and light-scattering beads within the first optical sheet.

The refractive part may be at the front surface of the first optical sheet. The first optical sheet and the second sheet may be spaced apart by a predetermined interval.

Optical members of the refractive part may be arranged in at least two groups, and the at least two groups may be separated by a region having no optical members. The region having no optical members may have a width that is greater than that of an optical member of an adjacent group, and the region having no optical members may be centered at a position corresponding to a centerpoint between two adjacent light sources. A center of each group of the at least two groups may be disposed at a position corresponding to a center of a light source, and a width of each group of the at least two groups may correspond to one-half of a distance between adjacent light sources.

Optical members of the refractive part may be spaced apart by first intervals at positions close to a light source and may be spaced apart by second intervals at positions farther from the light source, and the first intervals may be smaller than the second intervals.

Optical members of the refractive part that are close to a light source may have a first angle of refraction, and optical members of the refractive part that are farther from the light source have a second angle of refraction lower than the first angle of refraction. The optical members of the refractive part that are close to the light source may have a first height:pitch ratio, and the optical members of the refractive part that are farther from the light source may have a second height:pitch ratio lower than the first height:pitch ratio.

The optical members may be shaped as elliptical lenses with a major axis and a minor axis, the optical members of the refractive part that are close to the light source may have a first major axis:minor axis ratio, and the optical members of the refractive part that are farther from the light source may have a second major axis:minor axis ratio lower than the first major axis:minor axis ratio. The optical members having the first major axis:minor axis ratio may have a first height:pitch ratio, and the optical members having the second major axis:minor axis ratio may also have the first height:pitch ratio.

The optical members of the refractive part may be lenses projecting from a surface of the first optical sheet. The first optical sheet may further include light-scattering beads within the first optical sheet. The second optical sheet may further include a second refractive part having a plurality of optical members at a surface of the second optical sheet.

The second refractive part may be at the rear surface of the second optical sheet. Optical members of the second refractive part may be positioned to align with a light source.

Optical members of the second refractive part may be spaced apart by first intervals at positions close to a light source and may be spaced apart by second intervals at positions farther from the light source, and the first intervals may be smaller than the second intervals.

Optical members of the second refractive part that are close to a light source may have a first angle of refraction, and optical members of the second refractive part that are farther from the light source may have a second angle of refraction lower than the first angle of refraction. The optical members of the second refractive part that are close to the light source may have a first height:pitch ratio, and the optical members of the second refractive part that are farther from the light source may have a second height:pitch ratio lower than the first height:pitch ratio.

At least one of the above and other features and advantages may also be realized by providing a backlight unit, including a light source unit including at least one light emitting device, a diffuser plate, and a reflection plate disposed to reflect light emitted from the light source unit toward the diffuser plate. The diffuser plate may include a first optical sheet having a rear surface configured to receive light from a light source and having a front surface configured to provide light to a second optical sheet, the first optical sheet having a refractive part that includes a plurality of optical members at a surface of the first optical sheet, and a second optical sheet disposed in front of the first optical sheet, the second optical sheet including a rear surface configured to receive light from the first optical sheet, a front surface configured to emit light, and light-scattering beads within the first optical sheet.

At least one of the above and other features and advantages may also be realized by providing a liquid crystal display including a liquid crystal display panel having a viewing side and a backlit side, and a backlight unit according to an embodiment disposed adjacent to the backlit side.

BRIEF DESCRIPTION OF THE DRAWINGS

The above and other features and advantages will become more apparent to those of ordinary skill in the art by describing in detail example embodiments with reference to the attached drawings, in which:

FIG. 8 illustrates a graph depicting simulation results of an illuminance distribution of a comparative example;

FIG. 9 illustrates a graph depicting simulation results of a brightness distribution of the comparative example;

FIG. 11 illustrates a graph depicting simulation results of an illuminance distribution of Example 1;

FIG. 12 illustrates a graph depicting simulation results of a brightness distribution of Example 1;

FIG. 13 illustrates a graph depicting simulation results of an illuminance distribution of Example 2;

FIG. 14 illustrates a graph depicting simulation results of a brightness distribution of Example 2.

DETAILED DESCRIPTION OF THE INVENTION

Figure 1:
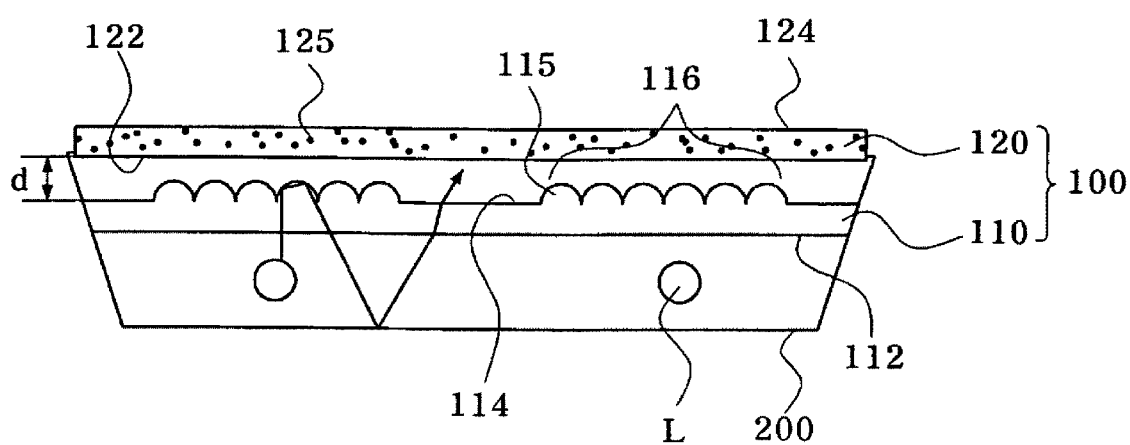
FIG. 1 illustrates a sectional view of a backlight unit with a diffuser plate including a first optical sheet and a second optical sheet according to an embodiment.

Korean Patent Application No. 10-2007-0109947, filed on Oct. 31, 2007, in the Korean Intellectual Property Office, and entitled: "Diffuser Plate Comprising Optical Sheet Having Optical Member and Optical Sheet Having Bead Particles," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

A diffuser plate including a first optical sheet with an optical member on a front surface thereof and a second optical sheet having beads in accordance with an embodiment will now be described in detail with reference to the drawings.

Figure 2:
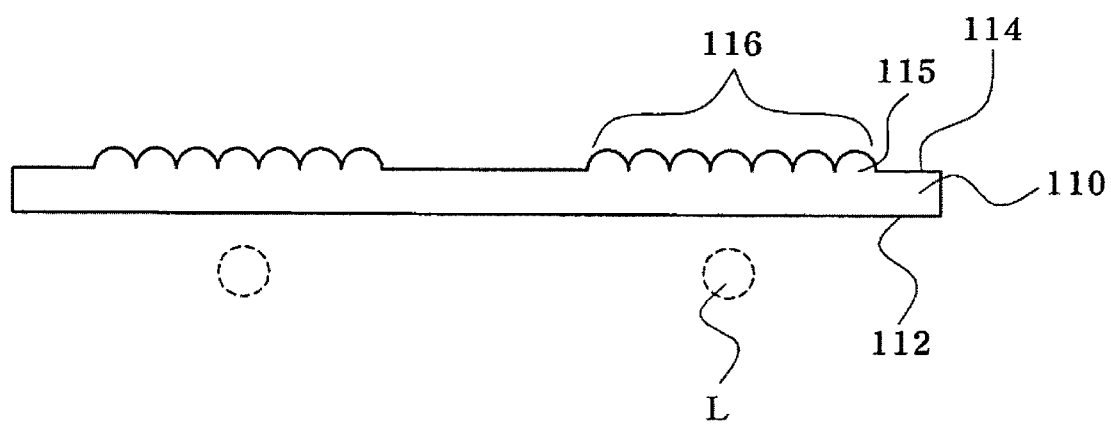
FIG. 2 illustrates a sectional view of the first optical sheet according to the first embodiment.
Figure 3:
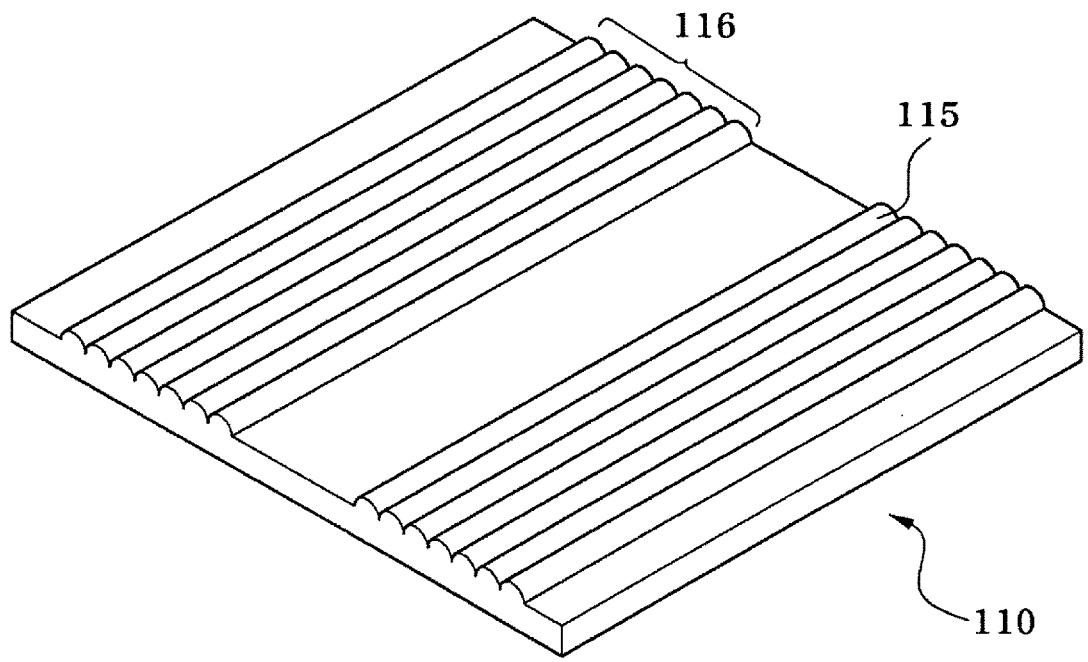
FIG. 3 illustrates a perspective view of the first optical sheet according to the first embodiment.

FIG. 1 illustrates a sectional view of a backlight unit with a diffuser plate including a first optical sheet and a second optical sheet according to an embodiment, FIG. 2 illustrates a sectional view of the first optical sheet according to the first embodiment, and FIG. 3 illustrates a perspective view of the first optical sheet according to the first embodiment.

Referring to FIGS. 1 to 3, a diffuser plate 100 according to the first embodiment may include a first optical sheet 110 and a second optical sheet 120. The first optical sheet 100 and the second optical sheet 120 may be spaced apart a predetermined interval (d) from each other.

When applied to a backlight unit, the first optical sheet 110 may be placed near a light source L and the second optical sheet 120 may be placed on the first optical sheet 110 to leave the predetermined interval (d) therebetween. With this configuration, light emitted from the light source L may be changed into a uniform surface light source upon passing through the first optical sheet 110 and the second optical sheet 120 in sequence. The light source L used in the backlight unit may include, e.g., point light sources such as light emitting diodes (LEDs), linear light sources such as cold cathode fluorescent lamps (CCFLs), etc. In an implementation, LEDs may be arranged in a column pattern.

In a general LCD, light emitted from a light source may appear brighter at a part near the center of the light source than other parts. Thus, the part near the center of the light source may be a "hot spot." The diffuser plate according to an embodiment may employ two optical sheets, e.g., the first and second optical sheets 110 and 120, to reduce or eliminate hot spots, and to improve brightness uniformity.

The first optical sheet 110 may have a rear surface 112 to which light is incident, and a front surface 114 from which the light exits. A refractive part 116 including a plurality of optical members 115 may be disposed at a surface of the first optical sheet, e.g., on the front surface 114. In another implementation (not shown), the optical members may be formed as features recessed into the rear surface 112 of the first optical sheet 110 so as to face the light source L.

The optical members 115 may be formed in groups and may be positioned in alignment with the light source L. The optical members 115 may reflect or refract light that travels straight from the light source L, thereby diffusing the light. In an implementation, light travelling straight from the light source L may be completely refracted or reflected so as to return toward a reflective sheet 200 disposed on an opposite side of the light source L. The refraction or reflection may be achieved by total internal reflection of the optical members 115. Light refracted or reflected by the optical members 115 may be further reflected from the reflective sheet 200 so as to return to the diffuser plate 100. The total refraction/reflection of light to the reflective sheet 200 and the subsequent reflection back toward the diffuser plate 100 is shown by an example light ray in FIG. 1.

The optical members 115 may be directly adjacent to one another, e.g., so as to contact one another, or may be spaced apart. For example, in an implementation, an optical member 115 of the refractive part 116 may be spaced apart from an adjacent optical member 115 of the refractive part by a distance that is roughly the same as the height, e.g., spaced apart by a distance of 80 μm for a height of 95 μm.

On the front surface 114 of the first optical sheet 110, parts other than the refractive parts 115 may transmit light without diffusing the light, e.g., the light may pass through the first optical sheet 110 in a same direction as an incident direction. Accordingly, the quantity of light per unit area (illuminance) incident to the second optical sheet 120 may be made more uniform.

In the accompanying drawings, embodiments are illustrated wherein the first optical sheet 110 includes lenticular lenses 115 having the shape of a ½ cylinder, i.e., semi-cylindrical lenses. In other implementations, the lenticular lenses may be, e.g., triangular lenses (prisms), rounded triangular lenses (prisms), or other lenses that provide total reflection or refraction of light.

In an implementation, the first optical sheet 110 may include light-refracting beads (not shown) therein to enhance a diffusion rate of the light. The beads may provide a generally Lambertian light distribution, such that light of generally uniform brightness is provided in all directions.

Referring again to FIG. 1, the second optical sheet 120 may be placed to face the front surface 114 of the first optical sheet 110. The second optical sheet 120 may have a rear surface 122 to which light is incident and a front surface 124 from which the light exits. The second optical sheet 120 may have light-refracting beads 125 therein to scatter the light.

The refractive part 116 formed in the first optical sheet 110 may adjust the quantity of light incident to the second optical sheet 120 so that the light incident on the second optical sheet 120 is substantially constant across the area of the second optical sheet 120, i.e., uniform. The light incident to the second optical sheet 120 may be scattered by beads 125 included in the second optical sheet 120, so that brightness may be made more uniform throughout the backlight unit.

The beads (also referred to as "diffusion particles") 125 in the first optical sheet 110 and/or the second optical sheet 120 may be different in refractive index from a resin used in the optical sheet, so that the light can be scattered by the difference in refractive indices. The beads 125 may include, e.g., silicon, polystyrene, polymethyl methacrylate (PMMA), silicon dioxide, etc. Beads 125 having an average size of, e.g., about 3 μm to about 10 μm may be generally used, although the size of the beads 125 may be adjusted depending on the application.

In an implementation, one or both optical sheets 110, 120, may be fabricated by co-extrusion of a core layer and a skin layer. In such a case, the diffusion rate of light in the optical sheet may be adjusted by changing the amount of beads used in the core layer and the skin layer. A polymer resin may be used for the first and second optical sheets 110, 120. In an implementation, the resin used for the first and/or second optical sheets 110, 120 may include, e.g., polystyrene, PMMA, polycarbonate, etc., or copolymers thereof.

The second optical sheet 120 shown in FIG. 1 does not include optical members on the rear surface 122 and the front surface 124. However, optical members for refracting or reflecting the light may be provided on the rear surface 122 and/or the front surface 124 of the second optical sheet 120 (for example, see optical members 6 in FIG. 10) in order to further reduce or eliminate an image of the light source L while enhancing the diffusion rate. In addition, optical members formed on the rear surface 122 or the front surface 124 of the second optical sheet 120 may be formed only at positions aligned with the light source L. In another implementation, the optical members may be formed uniformly throughout one or both surfaces of the second optical sheet 120 (for example, see optical members 6 in FIG. 10). Further, the optical members of the second optical sheet 120 may have shapes the same as, or different from, the shape of optical members of the first optical sheet 110, and may have, e.g., a shape of a lenticular lens, a prism, a round prism, etc.

Figure 4:
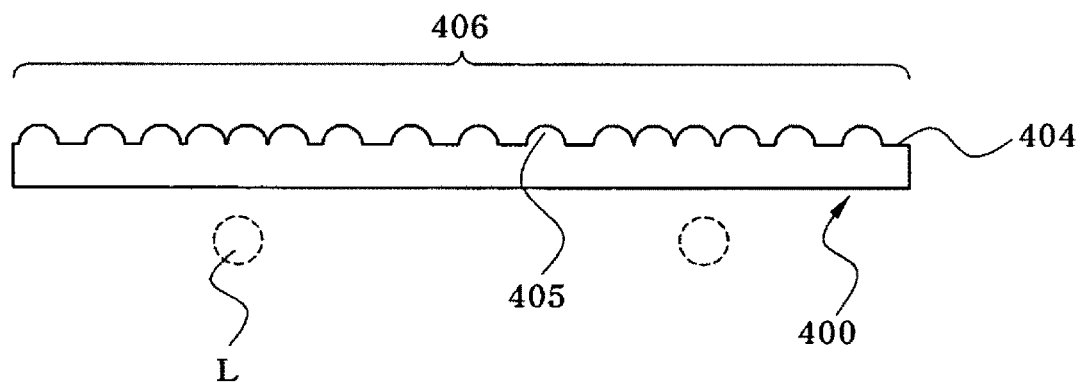
FIG. 4 illustrates a sectional view of a first optical sheet according to a second embodiment.
Figure 5:
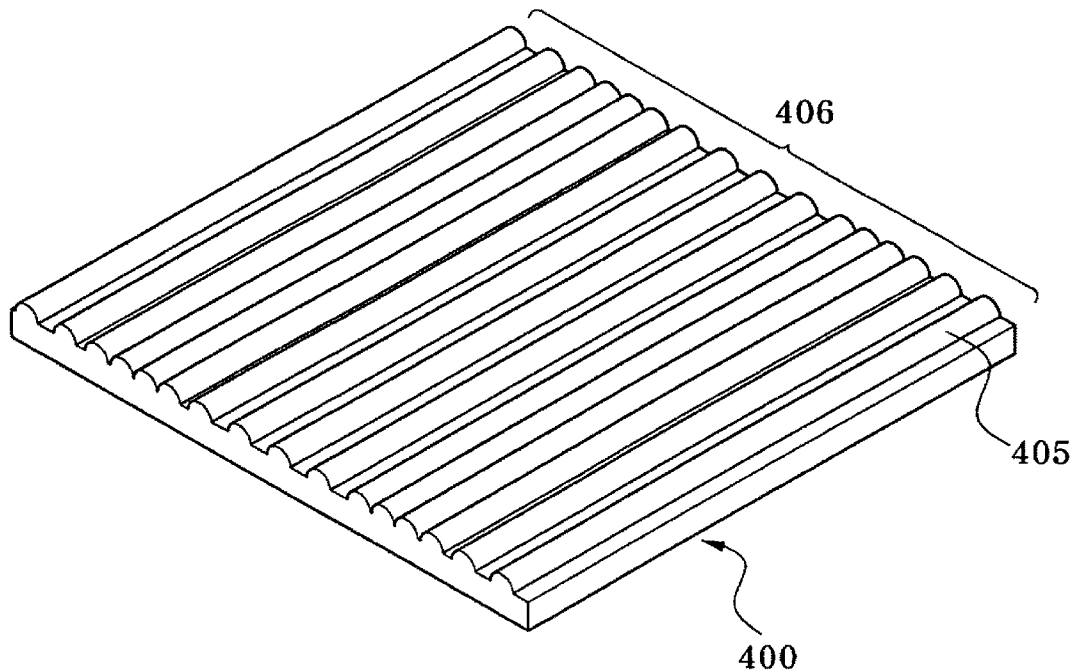
FIG. 5 illustrates a perspective view of the first optical sheet according to the second embodiment.

FIG. 4 illustrates a sectional view of a first optical sheet according to a second embodiment, and FIG. 5 illustrates a perspective view of the first optical sheet according to the second embodiment.

As described above in connection with the first embodiment, the optical members 115 (see FIG. 1) of the first optical sheet may be formed only at positions aligned with the light source L to form the refractive part 116. Referring to FIG. 4, in the second embodiment, optical members 405 may be formed over a front surface 404 of a first optical sheet 400 to form a refractive part 406, e.g., so as to cover the front surface with optical members 405. The optical members may be spaced apart by predetermined intervals, as described below.

Intervals between the optical members 405 may be varied according to distances from the light source L. In an implementation, the closer a distance between each of the optical members and the light source L, the narrower the intervals between adjacent optical members 405, whereas the farther the distance between each of the optical members and the light source L, the wider the intervals between adjacent optical members 405.

The quantity of light emitted from the light source L may be large at a position near the light source L. Accordingly, the optical members 405 may be arranged such that, as the distance between the optical members 405 and the light source L decreases, the intervals between adjacent optical members 405 may be narrowed to increase the total reflection and the refraction ratio. Further, as the distance between the optical members 405 and the light source L increases, the intervals between adjacent optical members 405 may become wider to increase a ratio of light having not experienced the total-reflection and the refraction, thereby enabling a constant quantity of light to be incident to the second optical sheet 120.

Figure 6:
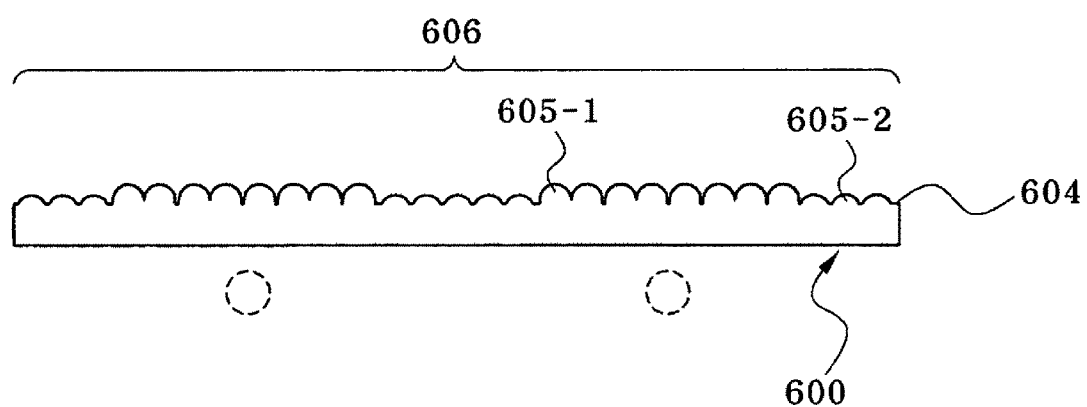
FIG. 6 illustrates a sectional view of a first optical sheet according to a third embodiment.
Figure 7:
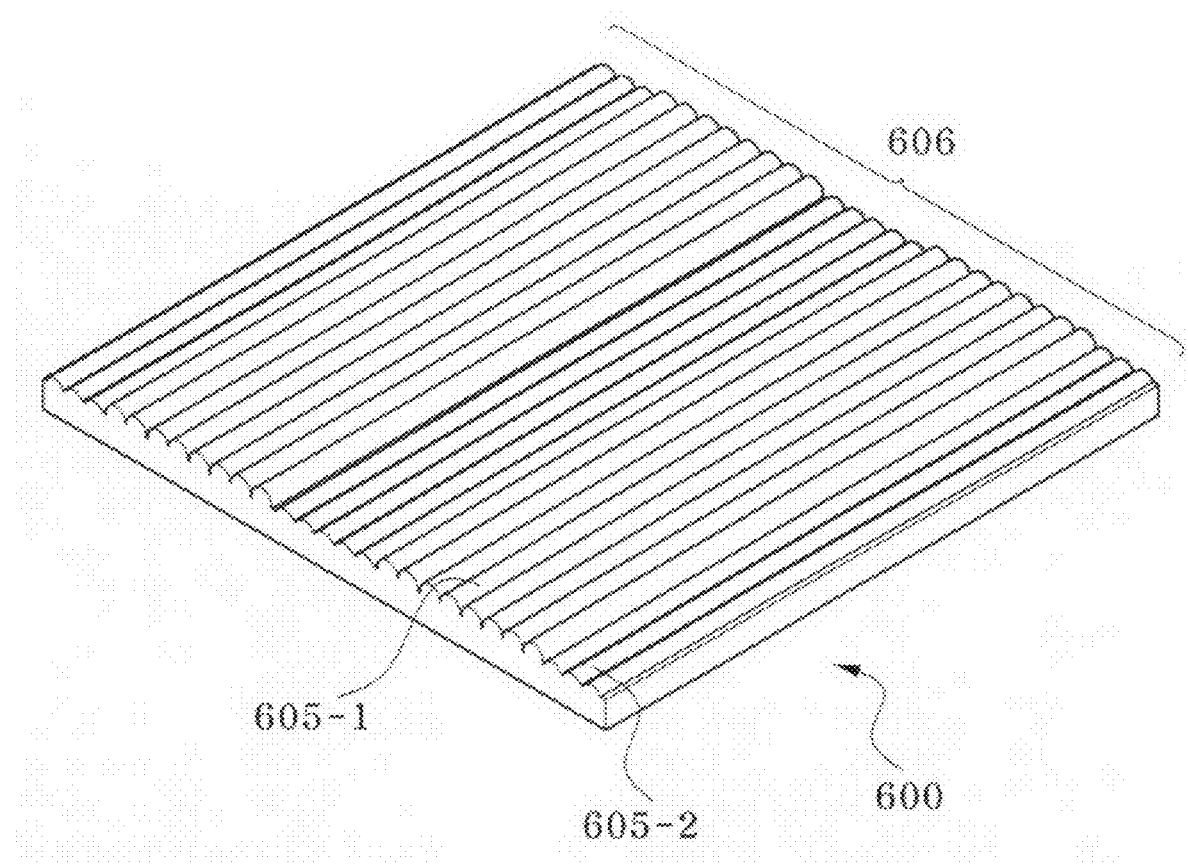
FIG. 7 illustrates a perspective view of the first optical sheet according to the third embodiment.

FIG. 6 illustrates a sectional view of a first optical sheet according to a third embodiment, and FIG. 7 illustrates a perspective view of the first optical sheet according to the third embodiment.

According to the third embodiment, a first optical sheet 600 may have a refractive part 606 formed at a front surface 604 thereof. An optical member 605-1 having a first height:pitch ratio (ratio of height to pitch), e.g., a relatively high ratio, may be disposed on a part adjacent the light source L, thereby relatively increasing reflection and refraction. Further, an optical member 605-2 having a second, relatively smaller height:pitch ratio may be disposed at a greater distance from the light source L, thereby relatively decreasing the reflection and the refraction. Thus, the third embodiment may provide the same effects as the first and second embodiments.

The shape of the optical members may be changed as necessary. The height and pitch, intervals, shapes, etc., of the optical members may be changed to provide a desired quantity of light to the second optical sheet 120. If the lenticular lens is used as the optical member, the lens may be spherical or aspherical. For the spherical lenticular lens, as the curvature and height of the lens increase, not only does the total reflection of light from the light source increase, but also a refractive angle of the light that exits from the lens increases. For the aspherical lenticular lens, an elliptical lens may be used. The shape of the lens may be varied by adjusting a ratio of the ellipse's major axis to its minor axis. Accordingly, even where the lenses have a same pitch and a same height, a lens having a higher ratio of the major axis to the minor axis may be more acute, thus increasing the total reflection and a refractive angle. Therefore, the quantity of light incident to the second optical sheet 120 may be adjusted by changing the pitch and the height, the ratio of the major axis to the minor axis, etc., of the lens.

The following Examples and Comparative Examples are provided in order to set forth particular details of one or more embodiments. However, it will be understood that the embodiments are not limited to the particular details described.

COMPARATIVE EXAMPLE

Brightness and illuminance distributions were simulated under conditions where CCFLs were employed as light sources and a diffuser plate included beads only, i.e., beads without an optical member. It should be noted that only relative values of the illumination and the brightness were considered relevant, and absolute values thereof were not considered to be actual values.

The distance between the CCFLs was 20 mm, and the distance from a reflective sheet to a rear surface of the diffuser plate in the backlight unit was 8.5 mm.

FIG. 8 illustrates a graph depicting simulation results of an illuminance distribution of a comparative example and FIG. 9 illustrates a graph depicting simulation results of a brightness distribution of the comparative example.

Referring to FIG. 8, the illuminance was broadly and non-uniformly distributed from 1100 to 1400 Lux, and the bright line of the light source could be clearly seen. Referring to FIG. 9, the brightness was also broadly and non-uniformly distributed from 300 to 420 Nit, and the bright line of the light source could be clearly seen.

Example 1

Figure 10:
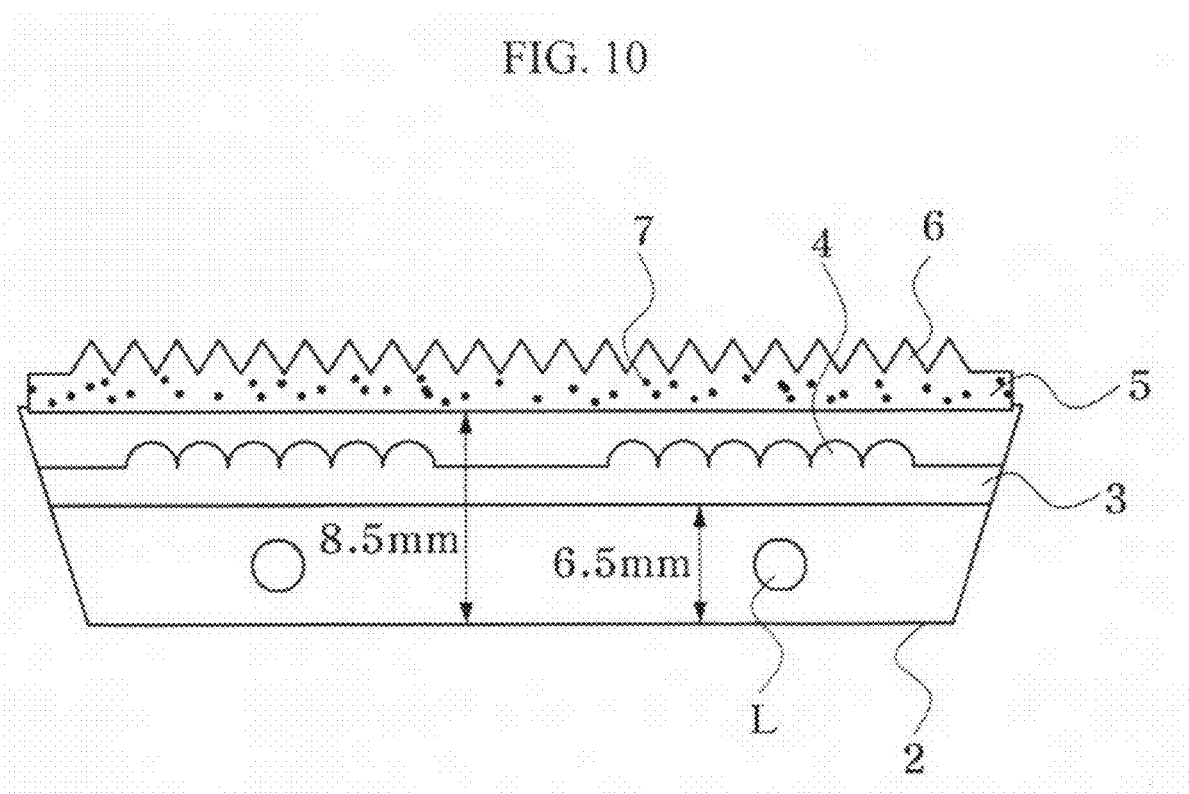
FIG. 10 illustrates a sectional view of Example 1 using a diffuser plate including a first optical sheet and a second optical sheet according to embodiments.
Figure 15:
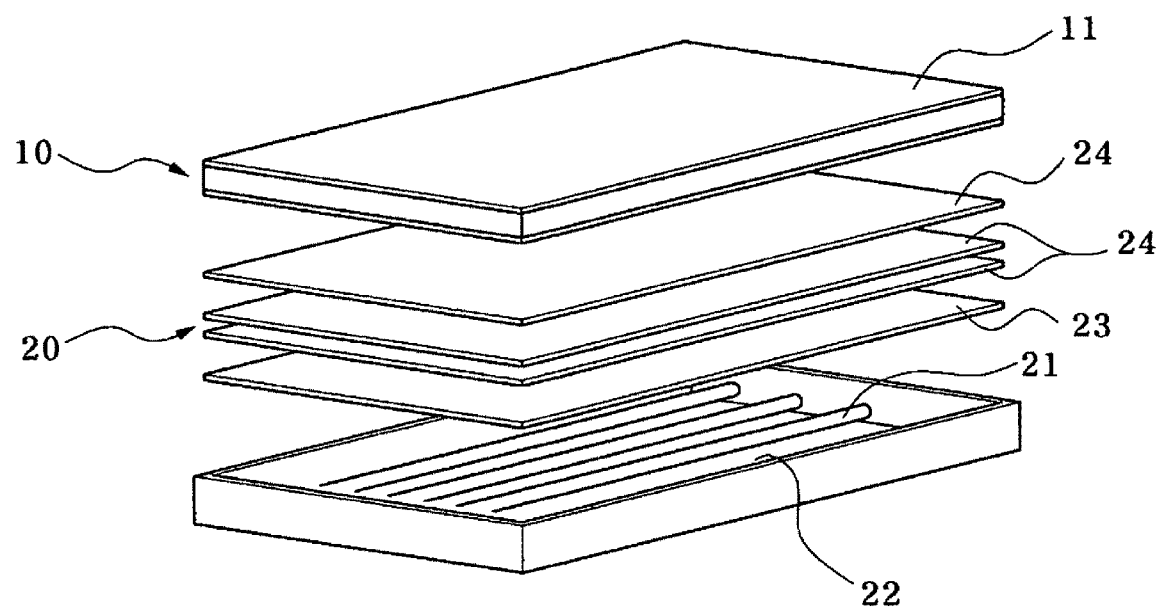
FIG. 15 illustrates an exploded perspective view of a general LCD.

FIG. 10 illustrates a sectional view of a structure according to Example 1, which used a diffuser plate including a first optical sheet 3 and a second optical sheet 5 according to embodiments. The light source and arrangement thereof was the same as for the Comparative Example. The first optical sheet and the second optical sheet according to embodiments were employed as the diffuser plate. In particular, referring to FIG. 10, the distance from a reflective sheet 2 to the rear surface of the first optical sheet 3 in a backlight unit was 6.5 mm. Lenticular lenses 4 were arranged as optical members on the front surface of the first optical sheet 3. The lenticular lenses 4 were formed at a position to be aligned with a light source, i.e., as in the first embodiment described above in connection with FIGS. 1-3.

The size of an area occupied by the lenticular lenses 4 was one-half of a separation between the light sources L. The lenticular lenses 4 had a pitch of 220 μm and a height of 95 μm, and a distance between the lenticular lenses 4 was 80 μm. A distance from the reflective sheet 2 to the rear surface of the second optical sheet 5 in the backlight unit was 8.5 mm. The first optical sheet 3 had a thickness of 1 mm and was made of polycarbonate.

The second optical sheet 5 had a thickness of 1 mm and was made of polystyrene. Light-refracting beads 7 made of silicon and having a size of 3~5 μm were in the second optical sheet 5. The optical transmission of the second optical sheet 5 was 60%. The front surface of the second optical sheet 5 was provided with prisms 6 as optical members of the refractive part. The prisms had an oblique angle of 45°, a pitch of 100 μm, and a height of 50 μm.

FIG. 11 illustrates a graph depicting simulation results of an illuminance distribution of Example 1 and FIG. 12 illustrates a graph depicting simulation results of a brightness distribution of Example 1.

Referring to FIG. 1, the illumination was centrally distributed between 1000 Lux and 1200 Lux and exhibited high uniformity, and a bright line of the light source was not seen. Referring to FIG. 12, the brightness was centrally distributed between 300 Nit and 350 Nit and exhibited high uniformity, and a bright line of the light source was also not seen.

Example 2

Example 2 used the same light source with the same arrangement as in Example 1. The first optical sheet and the second optical sheet according to embodiments were employed as the diffuser plate.

A distance from the reflective sheet to the rear surface of the first optical sheet of the backlight unit was 6.5 mm. The front surface of the first optical sheet included an area where a pattern of lenticular lenses was present and an area where the pattern of lenticular lenses was not present. The size of the area where the lenticular lenses were present was one-half of a separation between adjacent lamps. Lenticular lens 4 having a pitch of 220 μm and a height of 95 μm were used. The interval between the lenticular lenses was 80 μm. The first optical sheet had a thickness of 1 mm and was made of polycarbonate.

The distance from the reflective sheet to the rear surface of the second optical sheet in the backlight unit was 8.5 mm. The second optical sheet had a thickness of 1 mm and was made of polystyrene. Light-refracting beads made of silicon and having a size of 3~5 μm were in the second optical sheet. The optical transmission of the second optical sheet was 60%.

FIG. 13 illustrates a graph depicting simulation results of an illuminance distribution of Example 2 and FIG. 14 illustrates a graph depicting simulation results of a brightness distribution of Example 2.

Referring to FIG. 13, the illumination was centrally distributed between 1100 Lux and 1300 Lux and exhibited high uniformity, and a bright line of the light source was not seen. Referring to FIG. 14, the brightness was centrally distributed between 300 Nit and 400 Nit and exhibited high uniformity, and a bright line of the light source was not seen.

As apparent from the above description, in the diffuser plate according to embodiments, optical members may be formed at a surface of a first optical sheet to provide a constant total quantity (illuminance) of light incident to a second optical sheet. Beads may be provided in the second optical sheet to scatter light, thereby removing a bright line of the light source while enhancing brightness uniformity. Accordingly, in a backlight unit in which a distance between the light source and the diffuser plate is decreased to half or less of the existing distance, the diffuser plate according to embodiments may reduce or eliminate an image of the light source while providing uniform light. Thus, the diffuser plate may adjust a quantity of light from a light source to enhance brightness uniformity. Further, the diffuser plate may condense the light to improve brightness.

Example embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A diffuser plate, comprising:
a first optical sheet having a rear surface configured to receive light from a light source and having a front surface configured to provide light, the first optical sheet having a refractive part that includes a plurality of optical members at a surface of the first optical sheet; and
a second optical sheet disposed in front of the first optical sheet, the second optical sheet including a rear surface configured to receive light from the front surface of the first optical sheet, a front surface configured to emit light, and light-scattering beads within the second optical sheet, wherein:
optical members of the refractive part are arranged in at least two groups, and
the at least two groups are separated by a region having no optical members.

2. The diffuser plate as claimed in claim 1, wherein the refractive part is at the front surface of the first optical sheet.

3. The diffuser plate as claimed in claim 1, wherein the first optical sheet and the second sheet are spaced apart by a predetermined interval.

4. The diffuser plate as claimed in claim 1, wherein:
the region having no optical members has a width that is greater than that of an optical member of an adjacent group, and
the region having no optical members is centered at a position corresponding to a centerpoint between two adjacent light sources.

5. The diffuser plate as claimed in claim 1, wherein:
a center of each group of the at least two groups is disposed at a position corresponding to a center of a light source, and
a width of each group of the at least two groups corresponds to one-half of a distance between adjacent light sources.

6. A diffuser plate, comprising:
a first optical sheet having a rear surface configured to receive light from a light source and having a front surface configured to provide light, the first optical sheet having a refractive part that includes a plurality of optical members at a surface of the first optical sheet; and
a second optical sheet disposed in front of the first optical sheet, the second optical sheet including a rear surface configured to receive light from the front surface of the first optical sheet, a front surface configured to emit light, and light-scattering beads within the second optical sheet, wherein:
optical members of the refractive part are spaced apart by first intervals at positions close to a light source and are spaced apart by second intervals at positions farther from the light source, and
the first intervals are smaller than the second intervals.

7. A diffuser plate, comprising:
a first optical sheet having a rear surface configured to receive light from a light source and having a front surface configured to provide light, the first optical sheet having a refractive part that includes a plurality of optical members at a surface of the first optical sheet; and
a second optical sheet disposed in front of the first optical sheet, the second optical sheet including a rear surface configured to receive light from the front surface of the first optical sheet, a front surface configured to emit light, and light-scattering beads within the second optical sheet, wherein:
optical members of the refractive part that are close to a light source have a first angle of refraction, and
optical members of the refractive part that are farther from the light source have a second angle of refraction lower than the first angle of refraction.

8. The diffuser plate as claimed in claim 7, wherein:
the optical members of the refractive part that are close to the light source have a first height:pitch ratio, and
the optical members of the refractive part that are farther from the light source have a second height:pitch ratio lower than the first height:pitch ratio.

9. The diffuser plate as claimed in claim 7, wherein:
the optical members are shaped as elliptical lenses with a major axis and a minor axis,
the optical members of the refractive part that are close to the light source have a first major axis:minor axis ratio, and
the optical members of the refractive part that are farther from the light source have a second major axis:minor axis ratio lower than the first major axis:minor axis ratio.

10. The diffuser plate as claimed in claim 9, wherein:
the optical members having the first major axis:minor axis ratio have a first height:pitch ratio, and
the optical members having the second major axis:minor axis ratio also have the first height:pitch ratio.

11. The diffuser plate as claimed in claim 1, wherein the optical members of the refractive part are lenses projecting from a surface of the first optical sheet.

12. The diffuser plate as claimed in claim 1, wherein the first optical sheet further comprises light-scattering beads within the first optical sheet.

13. The diffuser plate as claimed in claim 1, wherein the second optical sheet further comprises a second refractive part having a plurality of optical members at a surface of the second optical sheet.

14. The diffuser plate as claimed in claim 13, wherein the second refractive part is at the front surface of the second optical sheet.

15. The diffuser plate as claimed in claim 14, wherein optical members of the second refractive part are positioned to align with a light source.

16. The diffuser plate as claimed in claim 14, wherein:
optical members of the second refractive part are spaced apart by first intervals at positions close to a light source and are spaced apart by second intervals at positions farther from the light source, and
the first intervals are smaller than the second intervals.

17. The diffuser plate as claimed in claim 14, wherein:
optical members of the second refractive part that are close to a light source have a first angle of refraction, and
optical members of the second refractive part that are farther from the light source have a second angle of refraction lower than the first angle of refraction.

18. The diffuser plate as claimed in claim 17, wherein:
the optical members of the second refractive part that are close to the light source have a first height:pitch ratio, and
the optical members of the second refractive part that are farther from the light source have a second height:pitch ratio lower than the first height:pitch ratio.

19. A backlight unit, comprising:
a light source unit including at least one light emitting device;
a diffuser plate; and
a reflection plate disposed to reflect light emitted from the light source unit toward the diffuser plate, wherein the diffuser plate includes:
a first optical sheet having a rear surface configured to receive light from a light source and having a front surface configured to provide light, the first optical sheet having a refractive part that includes a plurality of optical members at a surface of the first optical sheet, and
a second optical sheet disposed in front of the first optical sheet, the second optical sheet including a rear surface configured to receive light from the front surface of the first optical sheet, a front surface configured to emit light, and light-scattering beads within the second optical sheet, wherein:
optical members of the refractive part are arranged in at least two groups, and
the at least two groups are separated by a region having no optical members.

20. A liquid crystal display, comprising:
a liquid crystal display panel having a viewing side and a backlit side; and
the backlight unit as claimed in claim 19 disposed adjacent to the backlit side.

* * * * *